C. E. WIESELGREEN.
ELECTRICALLY INSULATED BEARING.
APPLICATION FILED JUNE 26, 1914.
1,152,680.
Patented Sept. 7, 1915.
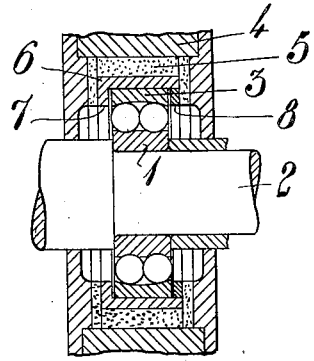
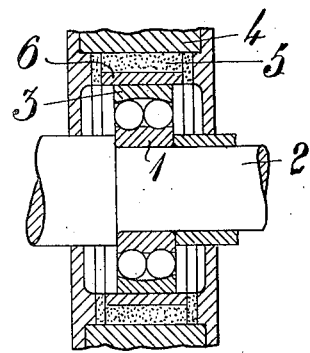
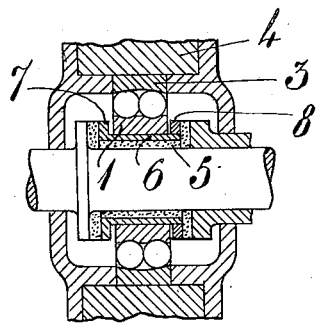
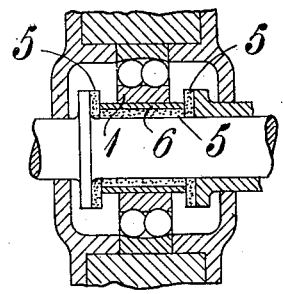
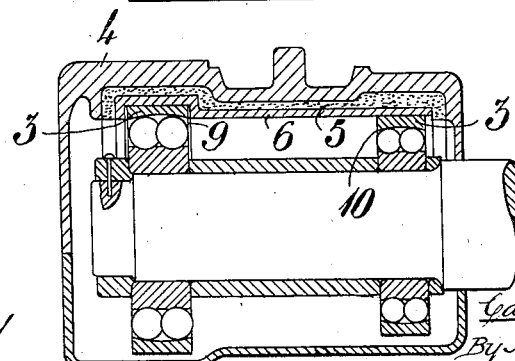
Witnesses:
Inventor
Carl Emil Wieselgreen
By Attys

UNITED STATES PATENT OFFICE.

CARL EMIL WIESELGREEN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

ELECTRICALLY-INSULATED BEARING.

1,152,680. Specification of Letters Patent. Patented Sept. 7, 1915.

Application filed June 26, 1914. Serial No. 847,363.

*To all whom it may concern:*

Be it known that I, CARL EMIL WIESELGREEN, a citizen of the Kingdom of Sweden, residing at Gottenborg, Sweden, have invented new and useful Improvements in Electrically-Insulated Bearings, of which the following is a specification.

This invention relates to ball or roller bearings having electric insulation.

As is known, the leakage field passing through the bearings of electric machines frequently causes the generation of large currents which heat the bearings. If the rotor of such machines is journaled in ball bearings or roller bearings, the said short circuit currents have to pass the comparatively small contact surfaces between the balls or rollers and the rings of the bearings and cause on account of the great current density that the balls or rollers as well as the bearing rings are easily burnt so that the whole bearing may easily be destroyed. Also in other cases it may happen that strong electric currents pass through the bearings, as for instance the bearings of electric railway or tramway cars, such currents preventing in many cases the use of ball bearings. Proposals have been made to overcome said inconvenience by placing an insulation between the outer ring of the bearing and the housing thereof. The provision of such an insulation is, however, accompanied by several inconveniences which, especially in ball bearings, are rather considerable. In ball bearings it is desirable to make the width of the bearing rings as small as possible which, however, renders it difficult to prevent overloading of the insulating material supporting the whole bearing pressure on a comparatively small surface. Besides, in so called wandering bearings, *i. e.* bearings freely movable in axial direction, the inconvenience will arise that the friction between the insulating material and the ring of the bearing in contact therewith becomes comparatively great and that the ring owing to the repeated sliding movements will soon wear out the insulating material.

The object of the present invention is to provide a ball or roller bearing of the kind mentioned and of such construction that the said inconveniences are avoided and by which is rendered possible, if desired, to mount the bearing so as to obtain a certain movability in axial direction without the risk of destroying the insulation.

With these objects in view the invention consists in this that between the insulation and the adjacent ring of the bearing is placed a bushing, shell, or the like of metal on which the said ring rests and, if desired, also may slide. The length of said bushing or shell may be larger than the width of the ring of the bearing in order to distribute the load on a larger surface of the insulating material than if the ring were in direct contact with the latter, thus preventing overloading of the insulating material.

These objects may be attained by means of the construction shown in the accompanying drawings which form a part of this specification and in which:—

Figures 1 and 2 are longitudinal sections of ball bearings having insulated outer rings. Figs. 3 and 4 are longitudinal sections of ball bearings having insulated inner rings. Fig. 5 shows an application of the invention to a bearing for tramway or railway cars.

Referring to the drawing Fig. 1 shows a bearing of an electric machine, which is so mounted in the outer casing that it is immovable or substantially immovable in axial direction. The inner ring 1 of the bearing is rigidly secured to the shaft 2 while the outer ring 3 is placed in the casing 4 and insulated therefrom by an insulation 5 of suitable material. The ring 3 is not supported direct by the insulating material 5 but by a bushing or sleeve 6 covering the said material. The sleeve 6 transmits the load to the insulation 5 and since the surface of the sleeve bearing against the insulating material is larger than the surface of the outer ring, the load per unit of surface of the insulation will be smaller than if the ring 3 were in direct contact with the insulating material. Flanges 7 and 8 which may be integral with the sleeve 6 or made as separate rings limit the movements of the ring 3 in axial direction or prevent such movements. If both flanges 7, 8 are integral with the sleeve 6, the latter, of course, is to be divided for allowing the bearing to be inserted into the sleeve.

The bearing shown in Fig. 2 differs from that shown in Fig. 1 mainly in this that is arranged as a so called wandering bearing, that is to say it is freely movable in axial direction in the casing 4. For this purpose the sleeve 6 placed between the outer ring 3 and the insulation 5 should have a comparatively large extension in axial direction without being provided with flanges preventing the axial movements of the ring 3. The said movements may take place with a rather small friction since the sliding is effected between two metal surfaces, and the risk of the insulation being damaged by the said sliding movements is entirely excluded.

In the bearing shown in Fig. 3 which likewise is intended for an electric machine, the electric insulation 3 is placed between the inner ring 1 and the shaft 2. The ring is not, however, supported directly by the insulation but by a sleeve 6 covering the insulation and distributing the load on a comparatively large surface of the insulating material. The outer ring 3 is rigidly secured in the casing 4 while the inner ring can slide a small distance in axial direction on the sleeve 6, the movements being limited by the flanges 7 and 8. If desired the said flanges may be in close contact with the ring 1 thus preventing entirely its movement in axial direction.

The bearing shown in Fig. 4 differs from that shown in Fig. 3 mainly in this that the inner ring 1 of the bearing is freely movable in longitudinal direction on the sleeve 6 which is of a comparatively great length and has no flanges for limiting the axial movements of the ring on the sleeve. Such flanges may, however be used, for keeping the insulating material 5 in position, provided the sleeve has sufficient length for allowing the ring 1 to move the necessary distance.

The support for the insulated ring of the ball bearing in Figs. 1, 2 and 5, is represented as the outer housing or casing, and in Figs. 3 and 4, as the shaft.

In Fig. 5 the invention is applied to a bearing of a tramway or railway car provided with two ball bearings 9 and 10. The bearing 9 is fixed in the housing 4 while the bearing 10 is a wandering bearing. The outer rings 3 of the ball bearings are supported by a metal socket or shell 6 common to both bearings. The insulation 5 is placed between said shell and the housing 4. Preferably, there is used an insulating mass which may be cast in between the housing and the metal shell and then hardened. The insulation as well as the metal socket or shell placed immediately inside thereof extend preferably only to the horizontal plane through the axis of the shaft 2 (on both sides of the shaft) so that their cross section forms a semicircle. As shown in the drawing the outer casing is divided. The mounting is accomplished in such manner that the two ball bearings are first mounted on the shaft whereafter the upper part of the housing provided with the insulation and the metal socket is placed in position.

Although I have shown in the drawing ball bearings having two series of balls, the invention is not, however, limited to such a construction but may with equal advantage be applied to ball bearings having one or more than two series of balls and if desired also to roller bearings and combined bearings of different kinds.

Having thus described my invention, what I claim is:—

1. The combination with a ball bearing ring of a support therefor, insulation carried by the support, and a metal sleeve engaging the ring and interposed between it and the insulation for distributing the load throughout the body of insulation.

2. The combination with a ball bearing ring of a support therefor, insulation wider than the ring carried by the support, and a metal sleeve engaging the ring and interposed between it and the insulation for distributing the load throughout the body of insulation.

3. The combination with a ball bearing ring of a support therefor, insulation carried by the support, and a metal sleeve engaging the ring with a working fit and interposed between it and the insulation for distributing the load throughout the body of insulation.

4. The combination with a ball bearing ring of a support therefor, insulation wider than the ring carried by the support, and a metal sleeve engaging the ring with a working fit and interposed between it and the insulation for distributing the load throughout the body of insulation.

In testimony that I claim the foregoing as my invention, I have signed my name in presence of two subscribing witnesses.

CARL EMIL WIESELGREEN.

Witnesses:
 AROF PALM,
 KARL RUNESKOG.